(12) United States Patent
Bierbaum et al.

(10) Patent No.: US 6,311,823 B1
(45) Date of Patent: Nov. 6, 2001

(54) CONVEYOR DEVICE

(75) Inventors: Günter Johann Bierbaum, Hettstadt; Klaus Walter Röder, Wüzburg, both of (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/463,991

(22) PCT Filed: Aug. 13, 1998

(86) PCT No.: PCT/DE98/02332

§ 371 Date: Feb. 22, 2000

§ 102(e) Date: Feb. 22, 2000

(87) PCT Pub. No.: WO99/10266

PCT Pub. Date: Mar. 4, 1999

(30) Foreign Application Priority Data

Aug. 22, 1997 (DE) .............................. 197 36 491

(51) Int. Cl.⁷ ............................ B65G 32/00; B65G 47/10
(52) U.S. Cl. ................ 198/360; 198/370.01; 198/370.04
(58) Field of Search .............................. 198/360, 370.01, 198/370.04, 359, 369.1, 371.1, 890

(56) References Cited

U.S. PATENT DOCUMENTS 5,044,862   9/1991   Herigstad et al. .

FOREIGN PATENT DOCUMENTS

| 3832865 C1 | 7/1989 | (DE) . | |
|---|---|---|---|
| 4034198 A1 | 4/1992 | (DE) . | |
| 4334582 A1 | 4/1995 | (DE) . | |
| 19606554 C1 | 6/1997 | (DE) . | |
| 0227887 A2 | 12/1985 | (EP) . | |
| 0387365 A1 | 9/1990 | (EP) . | |
| 0402902 A2 | 12/1990 | (EP) . | |
| 000732184-A | * 5/1980 | (SU) | ............... 198/370.01 |
| 001514708-A1 | * 10/1989 | (SU) | ............... 198/370.04 |
| 001583330-A1 | * 8/1990 | (SU) | ............... 198/370.04 |
| 001713872-A1 | * 2/1992 | (SU) | ............... 198/371.04 |

* cited by examiner

Primary Examiner—Christopher P. Ellis
Assistant Examiner—Kenneth W Bower
(74) Attorney, Agent, or Firm—Jones, Tullar & Cooper, PC

(57) ABSTRACT

A conveying device for a paper web roll in a web-fed printing press includes a conveyor car that rides on a support track recessed into the floor. A pair of alignment rails are situated adjacent to the support track. These alignment rails, or at least one of them is moveable between a rest position flush with the floor, and a roll alignment position in which it is inclined, at an acute angle with respect to the floor. In the roll alignment position, both of the alignment rails are inclined with respect to the floor.

3 Claims, 2 Drawing Sheets

CONVEYOR DEVICE

FIELD OF THE INVENTION

The present invention is directed to a device for positioning a paper web roll on a conveying car of an underfloor transport system. The paper web roll is typically useable in a web-fed printing press.

SUMMARY OF THE INVENTION

The object of the present invention is directed to providing a device for positioning a paper web roll on a conveying car of a underfloor conveying system.

In accordance with the present invention, this object is attained by the provision of a paper web roll conveying car which rides on rails that are located beneath the level of a floor. Alignment rails are placed in the floor adjacent, and parallel to the car rails. These alignment rails, or at least one of them, can be lifted or lowered or pivoted.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
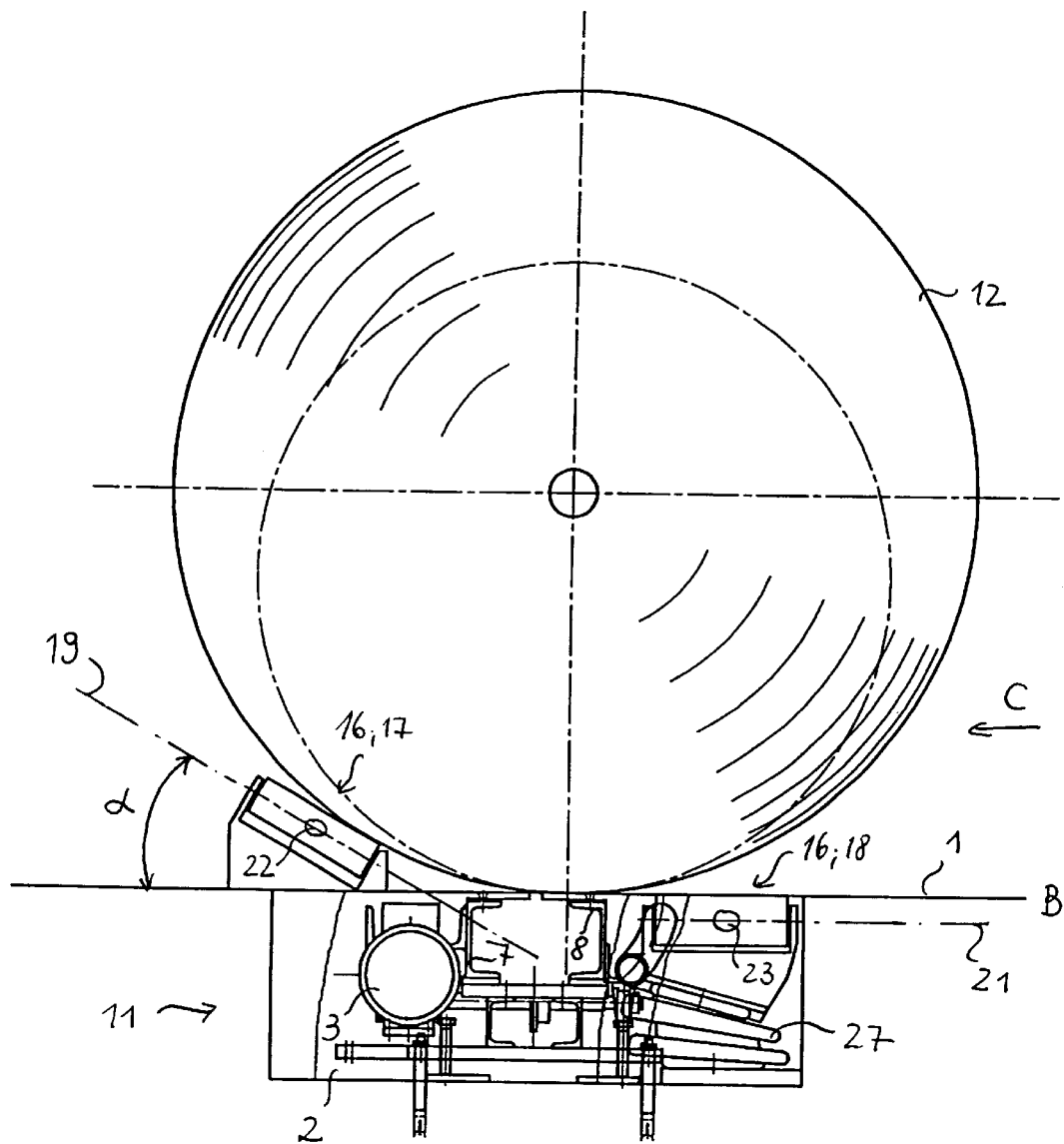
FIG. 1, a cross section through an underfloor conveying system, in accordance with the present invention, with a paper web roll and the device for positioning in the position of rest, and in FIG. 2, a representation in accordance with FIG. 1, but with the device for positioning in the work position.
Figure 2:
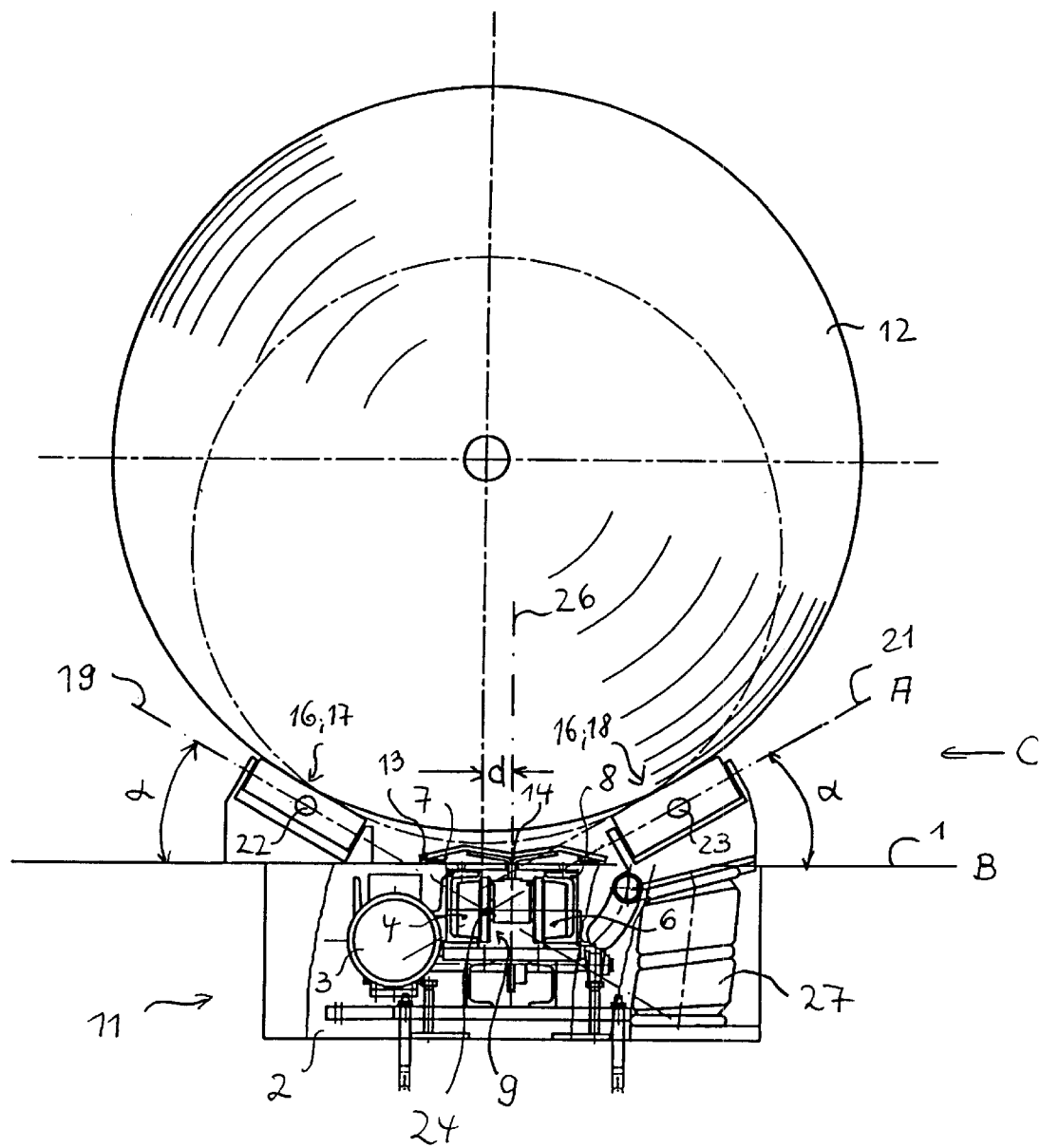

A conveying car 9 of a underfloor transport system 11, and which can be driven by means of a motor 3 on running wheels 4, 6 on rails 7, 8, is arranged in a conduit or channel 2 underneath a floor level 1, as seen in FIGS. 1 and 2. Conveying car 9 is used primarily for conveying paper web rolls 12.

The conveying car 9 has an upper transport platform 13, which is generally known. This upper transport platform 13 has a longitudinally oriented groove-shaped depression 14 and a lowest point. The transport platform 13 typically projects or is situated above the floor level 1, but this is not required. The groove-shaped depression 14 is used for orienting the longitudinal axis of the paper web roll 12 and for fixing it in position. A paper web roll pre-alignment device 16 is provided in the conduit or channel 2. It consists of alignment elements, for example of alignment rails 17, 18, which for example, are arranged to the left and right next to the rails 7, 8.

These alignment rails 17 and 18 will extend above the floor level 1, at least when they are in their alignment position A, as seen in FIG. 2. In their position of rest B, both alignment rails 17, 18 can lie below the floor level 1. Alternatively at least one, for example the left, alignment rail 17 can permanently project above the floor level 1, as in depicted in FIG. 1.

Either or both of the alignment rails 17 and 18 are used as a roll stop for the delivered paper web rolls 12. In the alignment position A, or respectively the roll stop position one or both alignment rails 17, 18 are inclined along their transverse axes 19, 21 at an acute angle $\alpha$, for example of 30 to 50°. Their longitudinal axes 22, 23 extend parallel with the floor level 1.

At least one of the alignment rails 17, 18 can be lifted and lowered, or respectively can be pivoted.

In the alignment position A, straight lines extending along the transverse axis 19 of the left alignment rail 17 and along the transverse axis 21 of the right alignment rail 18 intersect at a point 24, which is located either to the left or to the right of next to a perpendicular plane 26, which passes through the lowest point of the groove-shaped depression 14 of the transport platform 13.

The conveyor device of the present invention functions as follows:

A paper web roll 12, coming from the direction C, is rolled in a counterclockwise direction over the right alignment rail 18, which is in the position of rest B, until it touches the left alignment rail 17, as shown in FIG. 1. Now the right alignment rail 18 is pivoted by means of a lifting device, for example by means of one or several pneumatically actuable bellows cylinders 27, into its alignment position A by the amount of the angle of rotation $\alpha$. The paper web roll 12 is lifted upward as shown in FIG. 2 by of this movement of the right alignment rail 18 from its rest position B to its alignment position A. The paper web roll 12 is now held above the floor 1 between the two alignment rails 17 and 18. Now a conveying car 9 is moved underneath the lifted paper web roll 12. Here, the paper web roll 12 is off-centered by a horizontal difference or offset amount "d" in respect to the lowest point or the groove-shaped depression 14 of the transport platform 13.

Thereafter, the paper web roll 12 is moved or shifted on the transport platform 13 by actuating the bellows cylinder (s) 27 to lower the right alignment rail 18. In the course of this shifting of the paper web roll 12, it moves slightly in a clockwise direction, so that it assumes its final position in which it is centered or aligned over the depression 14. The difference amount "d" has disappeared. The right alignment rail 18 then assumes its original position of rest B.

While a preferred embodiment of a conveying device in accordance with the present invention has been set forth fully and completely hereinabove, it will be apparent to one of skill in the art that a number of changes in, for example, the drive mechanism for the transport cart, the overall size of the assembly, and the like could be made without departing from the true spirit and scope of the present invention which is accordingly to be limited only by the following claims.

What is claimed is:

1. A device for positioning a paper web roll in respect to a conveying car of an underfloor transport system comprising:

a conveying car support track positioned beneath a floor;

first and second alignment rails spaced transversely apart from each other on said floor on either side of said support track, said first and second alignment rails extending parallel to each other and parallel to said support track on said floor, each of said first and second alignment rails each having a transverse axis; and means for shifting at least one of said alignment rails with respect to said floor between a rest position and a paper web roll alignment position, said transverse axis of said at least one of said alignment rails extending at an angle to the floor when said at least one of said alignment rails is in said paper web roll alignment position, said first and second alignment rails cooperating to support a paper web roll above said support track and above a paper web roll receiving conveying car which is movable along said support track to a position beneath said paper web roll supported above said support track in said paper web roll alignment position.

2. The device of claim 1 further including a transport platform supported on said conveying car which is movable along said support track, said transport platform having a transport platform central depression extending in a direction of said support track, said transverse axes of said first and second alignment rails intersecting at a point, when both said first and second alignment rails are in said roll alignment position, said point being spaced from a perpendicular plane extending through said transport platform central depression.

3. A device for positioning a paper web roll on a conveying car of an underfloor transport system comprising:

a conveying car support track positioned beneath a floor level;

first and second alignment rails spaced transversely apart from each other on either side of said support track and extending parallel to each other and to said support track, each of said first and second alignment rails having a transverse axis;

means for shifting at least one of said alignment rails between a rest position and a roll alignment position, said transverse axis of said at least one of said alignment rails extending at an angle to the floor level when said at least one of said alignment rails is in said roll alignment position; and a transport platform supported for movement along said support track and having a transport platform central depression extending in a direction of said support track, said transverse axes of said first and second alignment rails intersecting at a point when both said first and second alignment rails are in said roll alignment position, said point being spaced from a perpendicular plane extending through said transport platform depression.

* * * * *